(12) United States Patent  (10) Patent No.: US 9,108,463 B2
Winters  (45) Date of Patent: Aug. 18, 2015

(54) WHEEL DOLLY FOR SMALL AIRCRAFT

(76) Inventor: Mason Jess Winters, Price, UT (US)

( * ) Notice: Subject to any disclaimer, the term of this patent is extended or adjusted under 35 U.S.C. 154(b) by 308 days.

(21) Appl. No.: 13/616,730

(22) Filed: Sep. 14, 2012

(65) Prior Publication Data

US 2014/0037409 A1 Feb. 6, 2014

Related U.S. Application Data

(60) Provisional application No. 61/679,500, filed on Aug. 3, 2012.

(51) Int. Cl.
*B60B 30/10* (2006.01)
*B60B 30/02* (2006.01)

(52) U.S. Cl.
CPC ............... *B60B 30/10* (2013.01); *B60B 30/02* (2013.01); *B60B 2900/351* (2013.01)

(58) Field of Classification Search
CPC ................................. B60B 29/002; B64F 1/22
USPC .................................................. 414/427, 428
See application file for complete search history.

(56) References Cited

U.S. PATENT DOCUMENTS

| | | |
|---|---|---|
| 1,248,896 A | 12/1917 | Olson |
| 1,275,716 A | 8/1918 | Maurer, Jr. |
| 1,361,889 A | 12/1920 | Miller et al. |
| 1,962,127 A | 6/1934 | Balkema et al. |
| 2,217,898 A | 10/1940 | Gemmill |
| 2,364,918 A | 12/1944 | Roberson |
| 2,369,603 A | 2/1945 | Phillips |
| 2,380,415 A | 7/1945 | Carruthers |
| 2,388,692 A | 11/1945 | House |
| 2,392,409 A | 1/1946 | Ray |
| 2,782,076 A | 2/1957 | Miller |
| 3,049,253 A | 8/1962 | Cabral |
| 3,583,723 A | 6/1971 | Nowell et al. |
| 3,598,259 A | 8/1971 | Wright |
| 3,720,422 A | 3/1973 | Nelson |
| 3,828,953 A | 8/1974 | Reznicek |
| 3,836,027 A | 9/1974 | Gardner |
| 3,877,591 A | 4/1975 | Howard |
| 3,954,198 A | 5/1976 | Sedelmayer |
| 4,121,788 A | 10/1978 | McMahon |
| 4,375,244 A | 3/1983 | Morin |
| 4,401,405 A | 8/1983 | Ealet |
| 4,596,506 A | 6/1986 | Burgardt et al. |
| 4,632,625 A | 12/1986 | Schuller et al. |
| 4,690,605 A | 9/1987 | Coccaro |
| 4,810,157 A | 3/1989 | Schopf |
| 4,854,803 A | 8/1989 | Coccaro |
| 4,900,215 A | 2/1990 | Nowell |
| 4,911,603 A | 3/1990 | Pollner et al. |
| 4,925,357 A | 5/1990 | Cisternino et al. |
| 4,950,121 A | 8/1990 | Meyer et al. |
| 4,976,449 A | 12/1990 | Lotspeich et al. |

(Continued)

*Primary Examiner* — Saul Rodriguez
*Assistant Examiner* — Emery Hassan
(74) *Attorney, Agent, or Firm* — Morriss O'Bryant Compagni, PC

(57) ABSTRACT

A wheel dolly for lifting and transporting a flat tire attached to an aircraft is comprised of a frame assembly having first and second laterally spaced frame members and a telescopic frame structure interposed between the laterally spaced frame members. A pair of tire scoops are pivotally coupled the frame assembly. An actuator is coupled between the tire scoops to pivot the tire scoops relative to the frame assembly in order to raise the tire scoops. A plurality of castors is coupled to the frame assembly to allow the frame assembly to roll in any direction.

20 Claims, 9 Drawing Sheets

(56) References Cited

U.S. PATENT DOCUMENTS

| | | |
|---|---|---|
| 5,013,205 A | 5/1991 | Schardt |
| 5,049,025 A | 9/1991 | Roman |
| 5,071,151 A | 12/1991 | Irwin |
| 5,104,279 A | 4/1992 | Melnick |
| 5,112,070 A | 5/1992 | Hahn |
| 5,259,572 A | 11/1993 | Franken et al. |
| 5,480,274 A | 1/1996 | Franken et al. |
| 5,549,436 A | 8/1996 | Fresia |
| 5,732,960 A | 3/1998 | Elam |
| 5,860,785 A | 1/1999 | Eberspacher |
| 5,893,571 A | 4/1999 | Nowell |
| 6,106,214 A | 8/2000 | Saffelle et al. |
| 6,199,826 B1 | 3/2001 | Nix |
| 6,283,696 B1 | 9/2001 | Trummer et al. |
| 6,739,822 B2 | 5/2004 | Johansson |
| 6,789,994 B2 | 9/2004 | Tortellier |
| 6,860,496 B2 | 3/2005 | Novak et al. |
| 6,863,488 B2 | 3/2005 | Chopra |
| 6,945,354 B2 | 9/2005 | Goff |
| 7,097,406 B1 | 8/2006 | Gang |
| 7,597,524 B2 * | 10/2009 | Hernandez .................. 414/428 |
| 7,708,516 B1 | 5/2010 | Snook |
| 7,740,439 B1 | 6/2010 | Browning et al. |
| 7,815,201 B2 | 10/2010 | Ceccarelli, III et al. |
| 7,914,247 B2 * | 3/2011 | Schuchardt .................. 414/430 |
| 7,988,402 B2 | 8/2011 | Adams |
| 8,016,303 B1 | 9/2011 | Ullman et al. |
| 8,066,467 B2 | 11/2011 | Hammonds |
| 2001/0038094 A1 | 11/2001 | Lundy |
| 2002/0098069 A1 | 7/2002 | Stahancyk et al. |
| 2003/0012630 A1 | 1/2003 | Brabson |
| 2007/0075511 A1 | 4/2007 | Shubert |
| 2009/0104009 A1 | 4/2009 | Hamman |

* cited by examiner

WHEEL DOLLY FOR SMALL AIRCRAFT

CROSS-REFERENCE TO RELATED APPLICATIONS

This application claims priority to U.S. Provisional Patent Application No. 61/679,500, filed Aug. 3, 2012, the entirety of which is incorporated by reference.

FIELD OF THE INVENTION

The present invention relates generally to devices commonly referred to as "wheel dollies". More specifically, the present invention relates to wheel dollies particularly adapted for use with small aircraft that allow a small aircraft with a flat tire to be taxied from the runway.

STATE OF THE RELATED ART

Various wheel dollies have been known in the art for lifting and moving vehicular wheels. The wheel dollies may be used separately, in pairs or in any number corresponding to the number of wheels on a vehicle. Wheel dollies have been described in the art as consisting of tow horizontal arms that are brought together toward the perimeter of a wheel. As the two arms are sufficiently brought together, the wheel is lifted from the ground and thus supported by the two arms and the wheel dolly.

Most prior art wheel dollies are provided to move one or more wheels of a vehicle around a workshop. In such situations, the wheel is being moved a relatively short distance and on an even concrete surface such that the possibility of the wheel being dislodged from the wheel dolly, even though only supported by a pair of horizontally disposed arms. Moreover, such prior art wheel dollies are not particularly adapted for lifting a flat tire that is still attached to a vehicle in which case the weight of the vehicle makes it difficult if not impossible to get the horizontally disposed arms sufficiently under the tire to be able to raise it from the ground. Such prior art wheel dollies are thus not particularly adapted for use on a flat tire attached to an aircraft. Such use could result in pinching the tire, in being unstable during movement of the aircraft and/or in damaging to the aircraft. Moreover, such prior art wheel dollies are not particularly adapted to be driven over a distance under power of the vehicle.

A particular problem that exists at airports that allow for landing of small aircraft, such as single or dual engine airplanes known in the art, is that it is rather common for such small aircraft to experience a flat tire upon landing. This is often due to a harder than usual landing that causes one or more of the tires of the airplane to blow. Once an airplane has experienced a flat tire on landing, under normal circumstances, it cannot be moved from the runway until the flat tire has been replaced and the airplane can then taxi from the runway. Obviously, the problem with such a situation is that the runway where the airplane is parked while the flat tire is being replaced cannot be used. At smaller airports, especially single runway airports, this presents a particularly problematic and potentially dangerous situation. That is, if a runway of a single runway airport is closed and another airplane requires an emergency landing, there may be no safe place for the airplane to land.

Thus, there exists a need in the art for a wheel dolly that may be used in rapid deployment to raise the wheel of an airplane that has experienced a flat tire and allow the airplane to taxi either under its own power or by being towed from the runway. The present invention provides a wheel dolly that is capable of safely and effectively addressing this need and others that will become apparent from description of the invention. The present invention is thus a significant improvement over wheel dollies known in the art.

SUMMARY OF THE INVENTION

Accordingly, the present invention provides a wheel dolly particularly configured for temporarily supporting and lifting a tire of a small airplane during taxi. The wheel dolly is configured for insertion beneath a flat tire still attached to an airplane and safely lifts the flat tire off the ground. Once the flat tire has been lifted and supported by the wheel dolly, the airplane can then be quickly and safely taxied from the runway, as by towing with a tug.

The wheel dolly may be configured to lift a wheel of an airplane that weighs up to about 8400 pounds having wheel diameters up to about 30 inch diameter and ten inch width. Of course, the wheel dolly of the present invention could be configured to lift much heavier airplanes having larger tires. In any case, a single person can safely and easily operate the wheel dolly of the present invention.

In one embodiment, a wheel dolly for lifting and transporting a flat tire attached to an aircraft comprises a frame assembly comprising a telescopic frame structure, a first side frame member coupled proximate a first end of the telescopic frame structure and a second frame member coupled to proximate a second end of the telescopic frame structure. The first and second frame members depend from a same side of the telescopic frame structure and are substantially parallel to one another. A first tire support structure is pivotally coupled to the first frame member and has a leading edge that is positionable proximate a ground level when in a lowered position and can be raised to a second position above the ground level. A second tire support structure is pivotally coupled to the second frame member and has a leading edge that is positionable proximate a ground level when in a lowered position and can be raised to a second position above the ground level. An actuator is coupled to the telescopic frame structure for selectively lengthening and shortening the telescopic frame member so as to selectively move the first and second tire support structures toward and away from one another. A ram has a first end portion pivotally coupled to an upper portion of the first tire support structure and a second end portion configured to be selectively coupled to an upper portion of the second tire support structure. The ram is capable of being lengthened to force the upper portion of the first tire support structure away from the upper portion of the second tire support structure to cause the first tire support structure to pivot relative to the first side frame member and the second tire support structure to pivot relative to the second side frame member until the first and second tire support structures are sufficiently raised above ground level. A plurality of wheels each downwardly depend from the frame assembly to allow the wheel dolly to roll upon the ground when the first and second tire support structure are sufficiently raised above ground level.

In another embodiment, the first and second tire support structures form scoops with each scoop comprised of a metal plate forming a plurality of surfaces having a generally crescent shape.

In another embodiment, the wheel dolly further comprises a hand pump in fluid communication with the ram for pressurizing the ram thus causing the ram to extend in length in order to pivot the first and second tire support structures relative to the first and second side frame members, respectively.

In yet another embodiment, the hand pump is attached to the telescopic frame structure.

In still another embodiment, the telescopic frame structure comprises a first telescopic frame member and a second telescopic frame member at least partially inserted with in the first telescopic frame member. The second telescopic frame member is longitudinally movable relative to the first telescopic frame member in order to increase or decrease the length of the telescopic frame structure.

In yet another embodiment, the actuator comprises a threaded actuator assembly coupled to and between the first telescopic frame member and the second telescopic frame member such that rotation of the threaded actuator causes the telescopic frame structure to lengthen or shorten depending on the direction of rotation of the threaded actuator.

In another embodiment, the ram comprises a cylinder portion pivotally coupled to the upper portion of the first tire support structure. The ram further includes a retaining member depending from a free end of the cylinder portion. The retaining member is configured for selective coupling to the upper portion of the second tire support structure.

In still another embodiment, the retaining member comprises a plurality of angled slots and the second tire support structure includes a transversely extending post coupled to the upper portion of the second tire support structure. The plurality of angled slots is configured for engaging with the post.

In still another embodiment, each of the first and second tire support structures comprise an idle roller coupled to a leading edge thereof for engaging with a flat tire coupled to an aircraft and guiding the respective tire support structure between the flat tire and the ground.

In yet another embodiment, the idle roller extends substantially a length of the leading edge of the tire support structure.

In still another embodiment, the first and second tire support structures each define a back surface extending from the leading edge to a top edge. The first and second tire support structures are each pivotally coupled to a respective side frame member proximate a midportion of the back surface.

These and other aspects and advantages of the invention will become more apparent from the following detailed description thereof and the accompanying exemplary drawings.

DETAILED DESCRIPTION OF THE
ILLUSTRATED EMBODIMENTS

Those of ordinary skill in the art will realize that the following description of the present invention is illustrative only and not in any way limiting. Other embodiments of the invention will readily suggest themselves to such skilled persons, including without limitation combinations of features of the illustrated embodiments.

Figure 1:
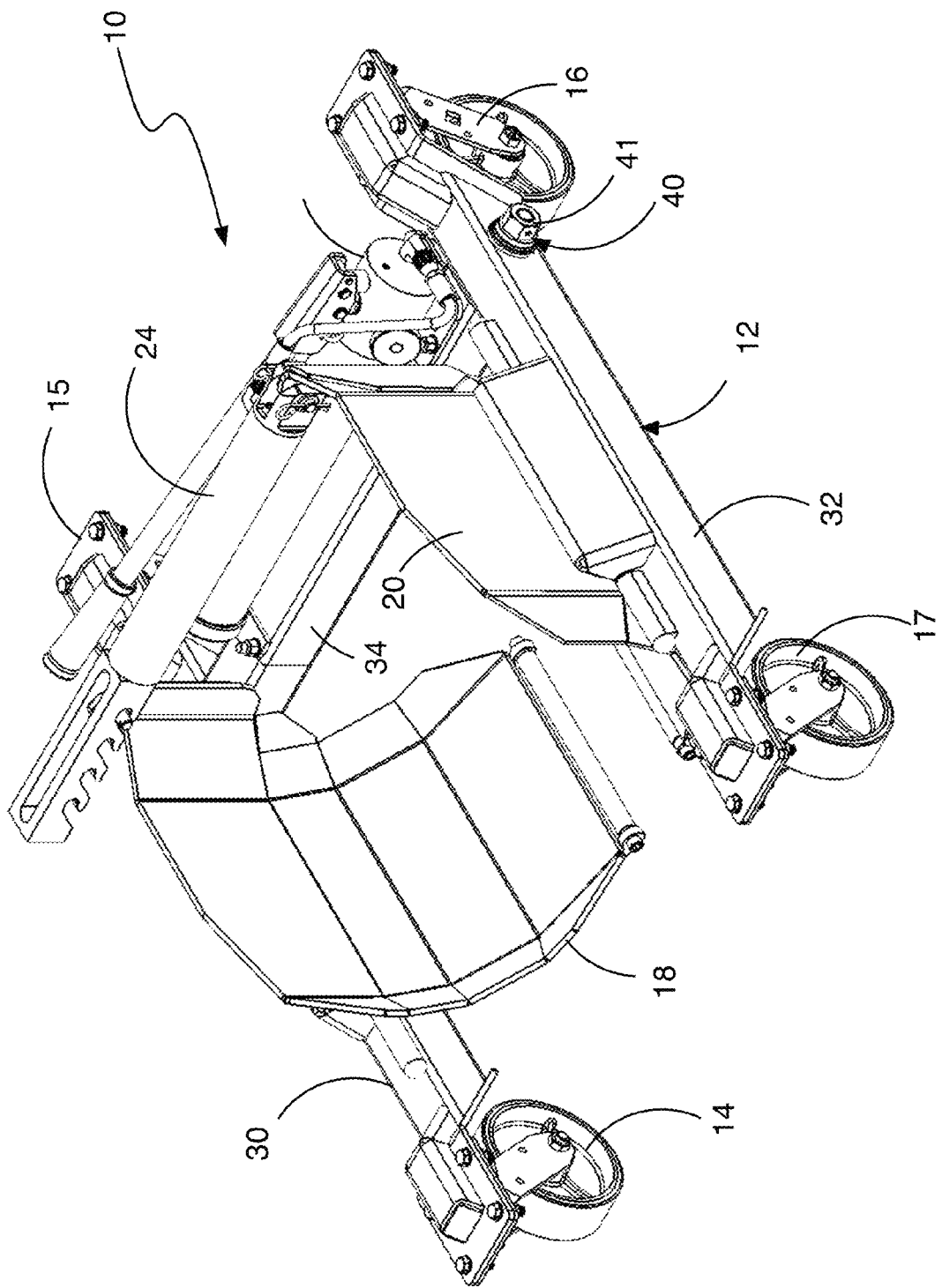
FIG. 1 is a perspective view of a wheel dolly in accordance with the principles of the present invention.

FIG. 1 illustrates a wheel dolly, generally indicated at 10, in accordance with the principles of the present invention. The wheel dolly 10 is particularly configured for temporarily supporting and lifting a tire of a small airplane during taxi. The wheel dolly 10 is more importantly configured to lift and support a tire of a small airplane that has become flat upon landing and to allow the airplane to be taxied from a runway while the wheel dolly 10 is supporting the tire of the airplane.

The wheel dolly 10 is comprised of a three-sided, rectangular frame structure 12 that defines four corners, each of which is supported by one of a plurality of casters 14-17. Each castor 14-17 is freely rotatable 360 degrees relative to the frame structure 12. A pair of oppositely disposed tire support structures or scoops 18 and 20 is pivotally attached to the frame structure 12. The scoops 18 and 20 are generally crescent shaped, essentially forming curved support surfaces for cradling a tire held therein between. The scoops 18 and 20 are coupled to a user actuated ram 24 that is capable of pivoting the scoops 18 and 20 about the frame structure 12 in order to selectively and controllably raise and lower the lower ends of the scoops 18 and 20 relative to the frame structure.

The frame 12 is comprised of laterally spaced frame members 30 and 32 to which scoops 18 and 20 are pivotally coupled. The frame members 30 and 32 are held apart and supported by telescopic frame structure 34. The telescopic frame structure 34 is configured to move the frame members 30 and 32 toward and away from each other so as to move the corresponding tire scoops 18 and 20. The telescopic frame structure 34 is actuated so as to lengthen or shorten its length and thus the spacing of the laterally spaced frame members 30 and 32 with threaded actuator 40. As such, rotating the hex nut 41 in one direction, as with a cordless drill will cause the telescopic frame member to extend and rotating the hex nut 41 in the opposite direction will cause the telescopic frame member to retract. The corresponding movement of the telescopic frame structure 34 upon rotation of the hex nut 41 causes the tire scoops 18 and 20 to move apart to be positioned around a tire and subsequently brought together to engage and support a tire between the tire scoops 18 and 20.

Once a tire has been fully engaged by the tire scoops 18 and 20, the tire scoops 18 and 20 are pivoted about the frame members 30 and 32, respectively, so as to cause the bottom portions of the tire scoops 18 and 20 to rise as the top portions of the tire scoops 18 and 20 are pivoted further apart from each other. The pneumatic ram 24 is coupled between the scoops 18 and 20 so as to force the upper portions of the scoops 18 and 20 apart in order to raise the lower portions of the scoops 18 and 20. The pneumatic ram 24 is pressurized by hand pump 42.

Figure 2:
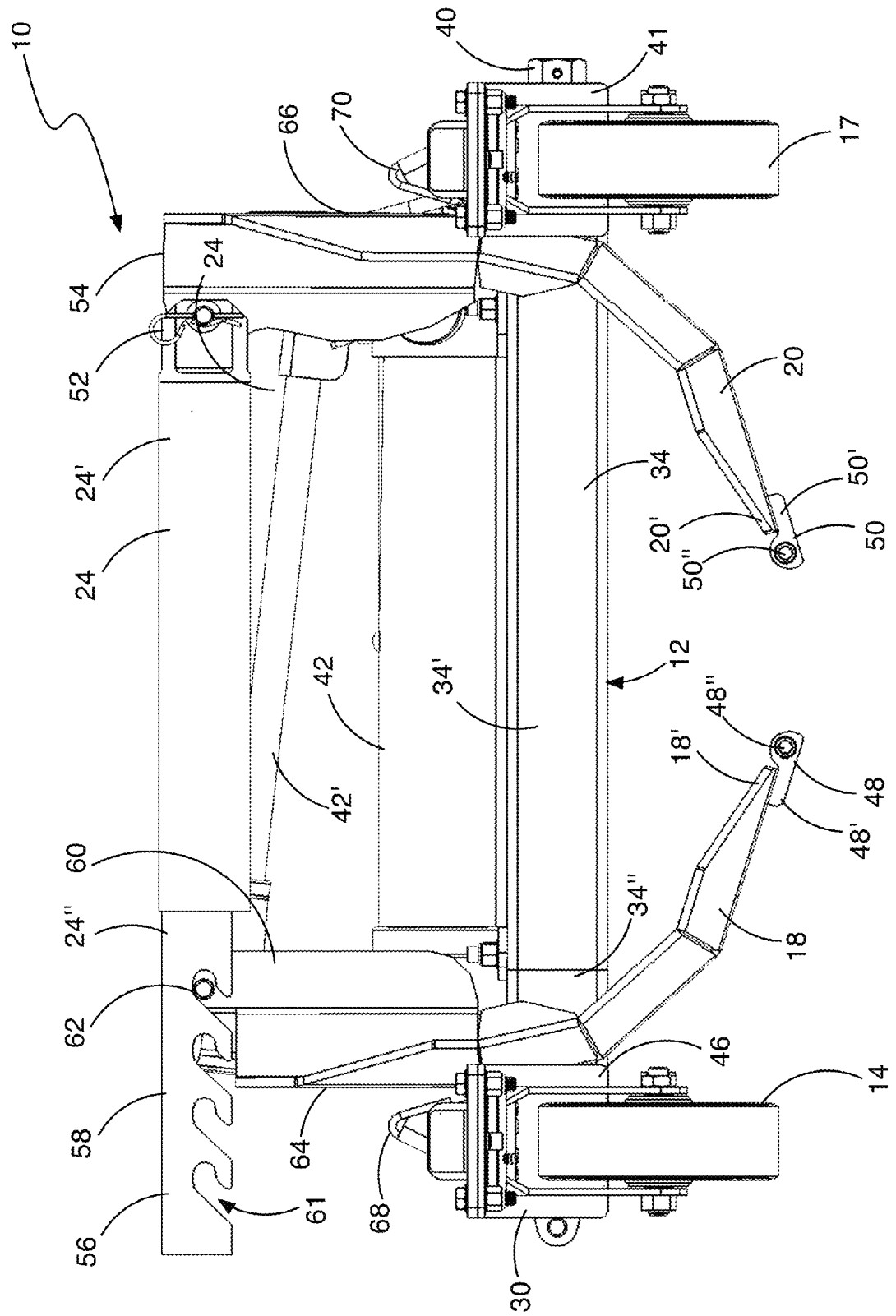
FIG. 2 is a front view of the wheel dolly illustrated in FIG. 1.

As further illustrated in FIG. 2, the scoops 18 and 20 are accessible through the open or distal side 46 of the frame 12. This allows the wheel dolly 10 to be rolled toward a tire with the tire entering the open side 46 of the frame 12 until the tire is positioned between the scoops 18 and 20. The scoops 18 and 20 are initially spaced apart a sufficient distance to all the wheel dolly 10 to be rolled into position with the scoops 18 and 20 positioned on opposite sides of the tire. Once positioned with the scoops 18 and 20 positioned on opposite sides of the tire, the scoops are brought together until the scoops 18 and 20 adequately support the tire. In order to facilitate positioning the engaging ends 18' and 20' of the tire scoops 18 and 20, the tires scoops are provided with elongate idle roller assemblies 48 and 50, respectively. The idle roller assemblies are attached to the engaging ends 18' and 20' of the scoops 18 and 20 with lateral support members 48' and 50' that depend from a respectively from the bottom surfaces of the scoops 18 and 20. Each lateral support member 48' and 50' includes a bearing therein so as to allow free rotation of the roller members 48" and 50", respectively, relative thereto. The idle roller assemblies 48 and 50 allow the engaging ends 18' and 20' of the tire scoops 18 and 20 to slide under a flat tire without damaging the tire, essentially providing a rolling engagement of the scoops 18 and 20 with the tire as the scoops 18 and 20 are brought closer together in order to lift the tire.

As further illustrated in FIG. 2, the scoops 18 and 20 are first brought together by shortening the length of the telescopic frame member 34. The telescopic frame member 34 is comprised of a first rectangular frame member 34' and a second rectangular frame member 34" that is sized and shaped to fit and slide within the first rectangular frame member 34'. Rotation of the threaded actuator 40 in the proper direction causes the second frame member 34" to be retracted within the first frame member 34'. Because the frame member 30 is attached to the second frame member 34" and the frame member 32 is attached to the first frame member 34', retraction of the second frame member 34" into the first frame member 34' moves the frame member 30 toward the frame member 32 while maintaining their substantially parallel relationship in order to bring the ends 18' and 20' of the scoops 18 and 20 toward one another. In addition, because the ends 18' and 20' of the scoops 18 and 20 are the first portions of the scoops 18 and 20 to engage the tire with the lower portions of the scoops 18 and 20 below the fulcrums of the pivoting motion of the scoops 18 and 20 the scoops 18 and 20 are maintained in their positions as shown in FIG. 2 with the ends 18' and 20' held apart their maximum distance as the scoops 18 and 20 are brought together by actuation of the telescopic frame member 34. Thus, the scoops 18 and 20 are held in a first downwardly pivoted position during this first portion of an operation to lift a tire held between the scoops 18 and 20.

Once the scoops 18 and 20 are sufficiently forced into engagement with the tire so that the horizontally spaced sides of the tire abut against the inside surfaces of the scoops 18 and 20 proximate the vertically oriented portions of the scoops 18 and 20 proximate the pivot points of the scoops 18 and 20, ram 24 is used to cause the scoops 18 and 20 to pivot relative to the frame 12. The ram 24 includes a cylinder portion 24' and a piston portion 24". The ram 24, and more particularly, the pivotally attached end of the cylinder 24', is pivotally coupled at a first end 52 to the upper end 54 of the scoop 20. The opposite free end 56 of the ram 24, which comprises a slotted engagement member 58 is configured to allow selective engagement of the engagement member 58 with the upper end 60 of the scoop 18 in order to change the effective length of the ram 24. In this embodiment, the engagement member 58 is provided with four angled slots, such as slot 61, for engaging and retaining a laterally depending post member 62. Each slot is defined by angled side walls that are angled at approximately 45 degrees to a longitudinal axis of the ram 24 and that are angled from an opening of the slot toward the pivotally attached end 52 of the ram 24. Each slot 61 also includes a semicircular termination that is sized to receive the post 62 and that is oriented so that the slot 61 extends substantially parallel to the longitudinal axis of the ram 24 a short distance toward the end 52 of the ram 24. This causes the post 62 to be seated within the slot 61 as the ram 24 is extended to lift the ends 18' and 20' of the scoops 18 and 20. Thus, the various slots 61 are provided to allow the ram 24 to engage the post 18 at a distance dictated by the particular tire being lifted. That is, for a tire having a smaller diameter, the slot 61 in which the pin 62 resides as shown in FIG. 2 may be used, while a larger diameter tire may require the most distal slot 61 to be used. Once the tire is properly positioned between the scoops 18 and 20 and the engagement member 58 is engaging the pin 62 as illustrated, the hand pump 42 can be actuated by pivoting the handle 42' in order to pressurize the ram 24 causing the engagement member 58 to further extend from the cylinder 24' of the ram 24. As the ram 24 extends in length, the ends 60 and 54 of the scoops 18 and 20, respectively, are forced apart until the back sides 64 and 66, respectively, of the scoops 18 and 20 abut against the angled stop members 68 and 70. Once the scoops 18 and 20 are held against the stop members 68 and 70, the scoops 18 and 20 are rigidly held in place with the tire being lifted from the ground and able to be transported with the casters 14-17.

Figure 3:
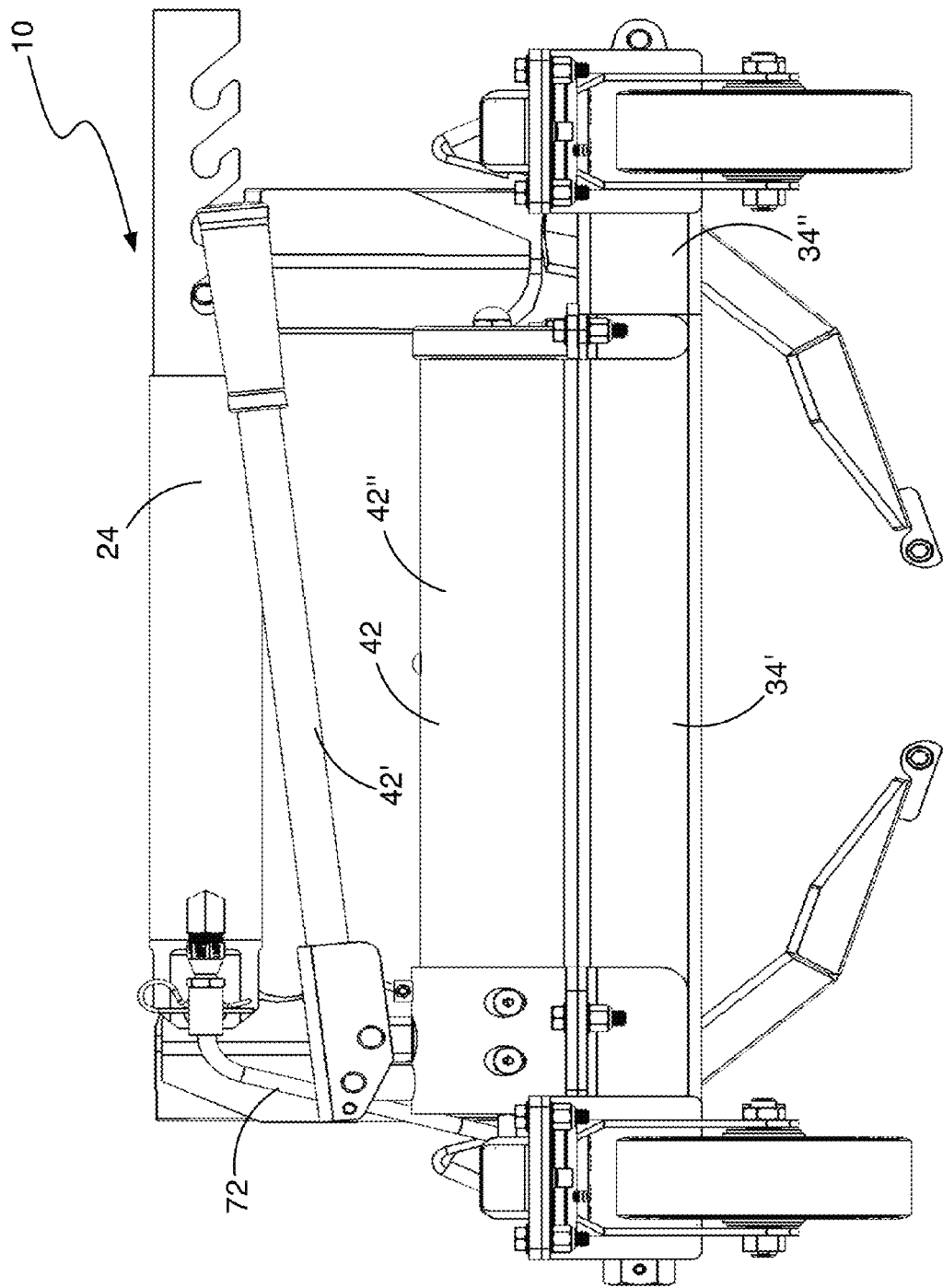
FIG. 3 is a back view of the wheel dolly illustrated in FIG. 1.

Referring now to FIG. 3, the proximal side of the wheel dolly 10 is illustrated. The hand pump 42 is rigidly coupled, as by bolting, to the exterior telescopic frame member 34' with the handle 42' positioned above the pump housing 42". The handle 42' is pivotally coupled to the pump housing 42". Thus, the handle 42' can be vertically actuated without interference from other components while maintaining a compact wheel dolly design. By coupling the pump 42 to the exterior telescopic frame member 34', the interior telescopic frame member 34" can be retracted into and extended from the frame member 34' without interference. A line 72 is coupled between and in fluid communication with the hand pump 42 and the ram 24. The line 72 allows the fluid (e.g., hydraulic fluid or air) contained within the pump 42 to flow into the ram 24 in order to extend the ram 24. When the pressure provided by the pump 42 is released, the ram 24 can be retracted.

Figure 4:
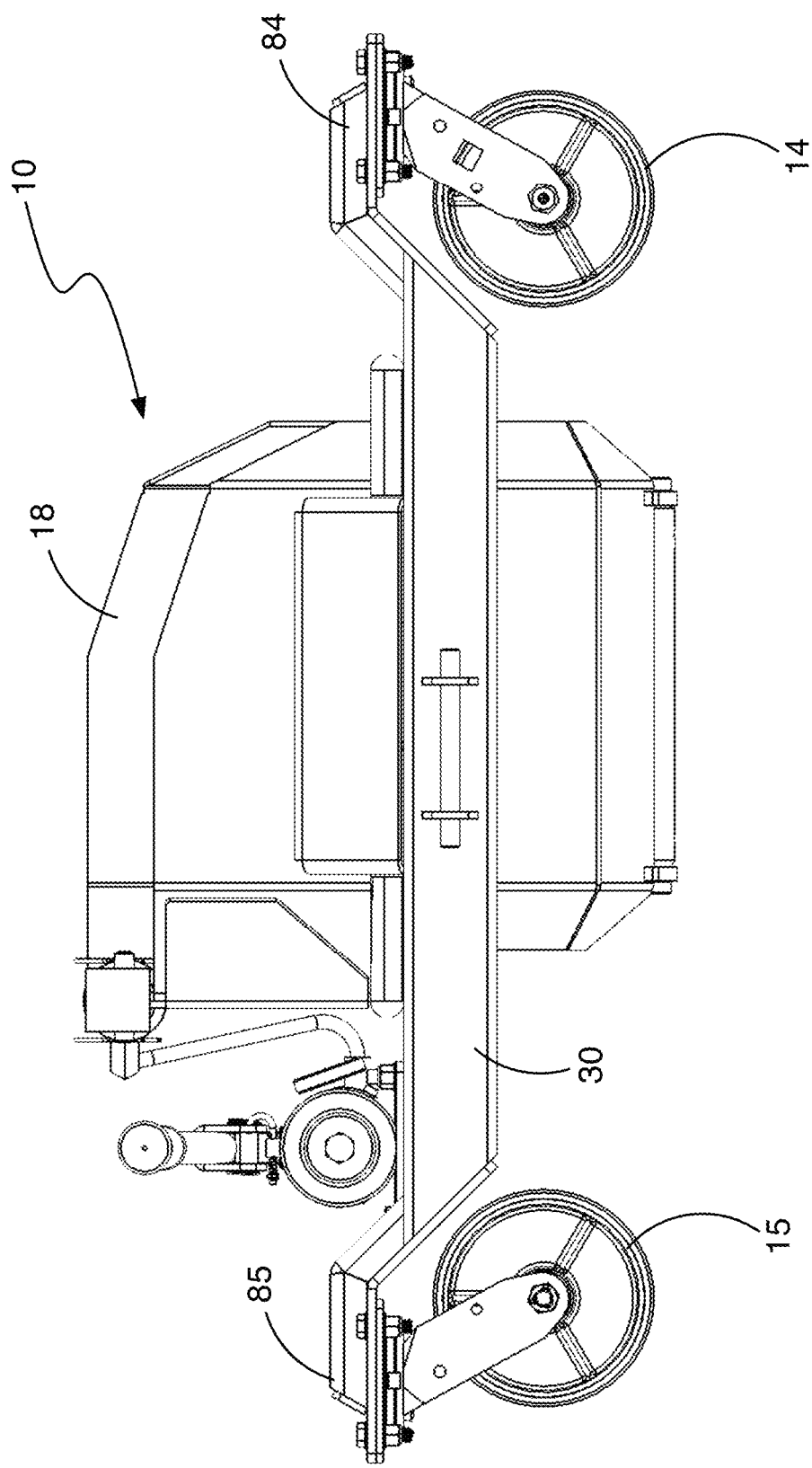
FIG. 4 is a left view of the wheel dolly illustrated in FIG. 1.
Figure 5:
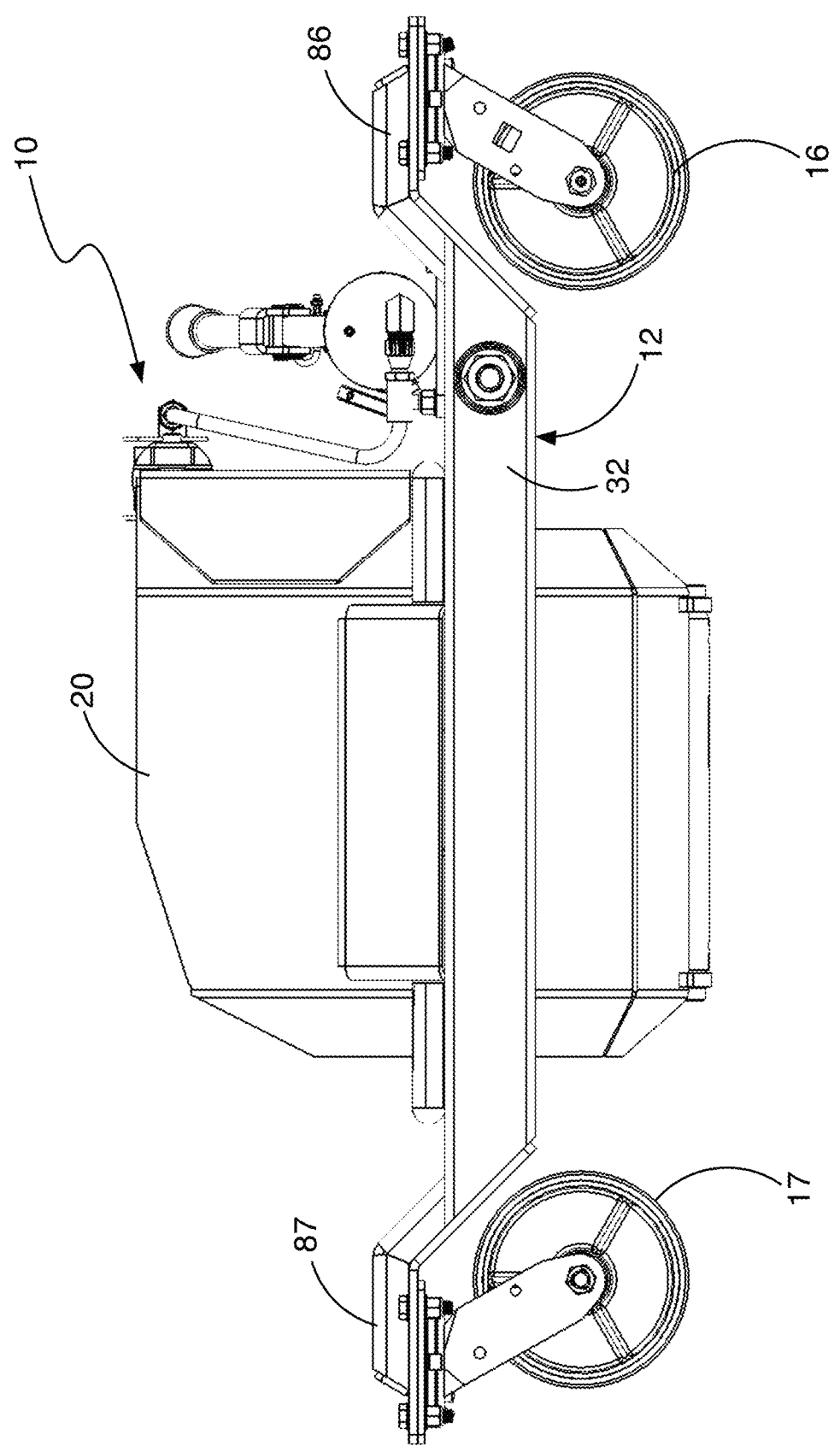
FIG. 5 is a right view of the wheel dolly illustrated in FIG. 1.

As illustrated in FIGS. 4 and 5, the wheel dolly 10 is configured to have a relatively low center of gravity so as to allow the wheel dolly 10 to have a relatively low profile and also to allow the wheel dolly 10 to be used over long stretches of taxiing an aircraft without the possibility of the wheel dolly 10 being tipped. This, in combination with the effective width of the wheel dolly 10 beyond the width of the tire being supported ensures that the wheel dolly 10 can provide safe and effective transport of a wheel and tire still attached to an aircraft as the aircraft is taxied from a runway. Each castor assembly 14-17 is coupled to the frame 12 at the effective corners thereof. The castors 14-17 are self-orienting casters such that the axis of rotation of each wheel of the castor is vertically and horizontally offset from the center or rotation at the location where the castor is attached to the frame 12. Thus, depending on the direction of movement of the frame 12, the castors will orient themselves, since they are freely rotatable a full 360 degrees, so as to roll in a proper direction relative to the movement of the frame 12, much like a castor on a shopping cart. The frame 12 is provided with elevated castor attachment portions 84-87 that depend from and are angled away from the frame members 30 and 32. The attachment portions 84-87 allow for larger sized castors 14-17 to be utilized while still maintaining a relatively low center of gravity of the wheel dolly 10 as well as positioning the scoops 18 and 20 at ground level when in a pre-pivoted or lowered position. The castors 14-17 are bolted to the attachment portions 84-87 so as to allow replacement of a castor if the castor becomes damaged during use.

Figure 6:
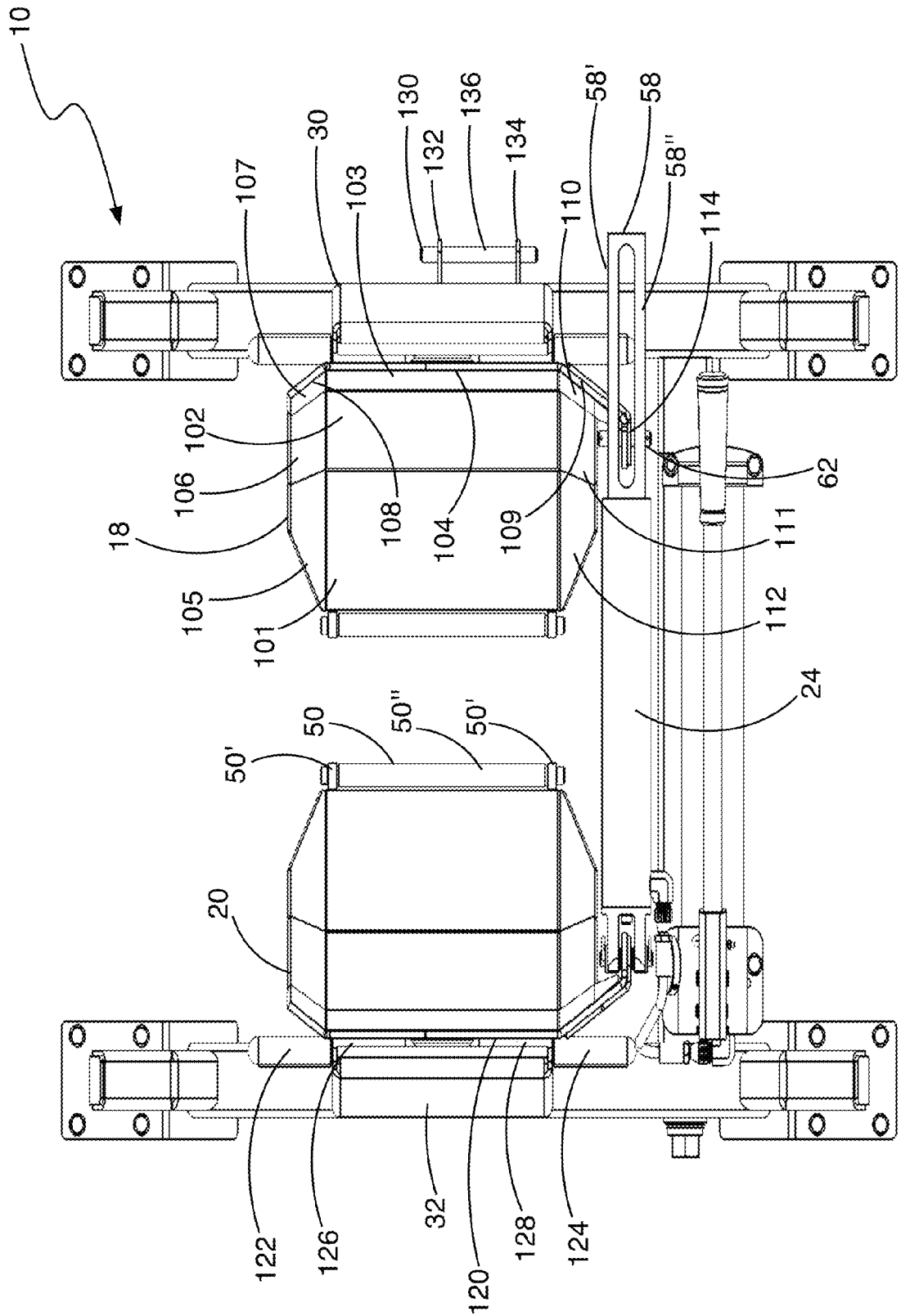
FIG. 6 is a top view of the wheel dolly illustrated in FIG. 1.
Figure 7:
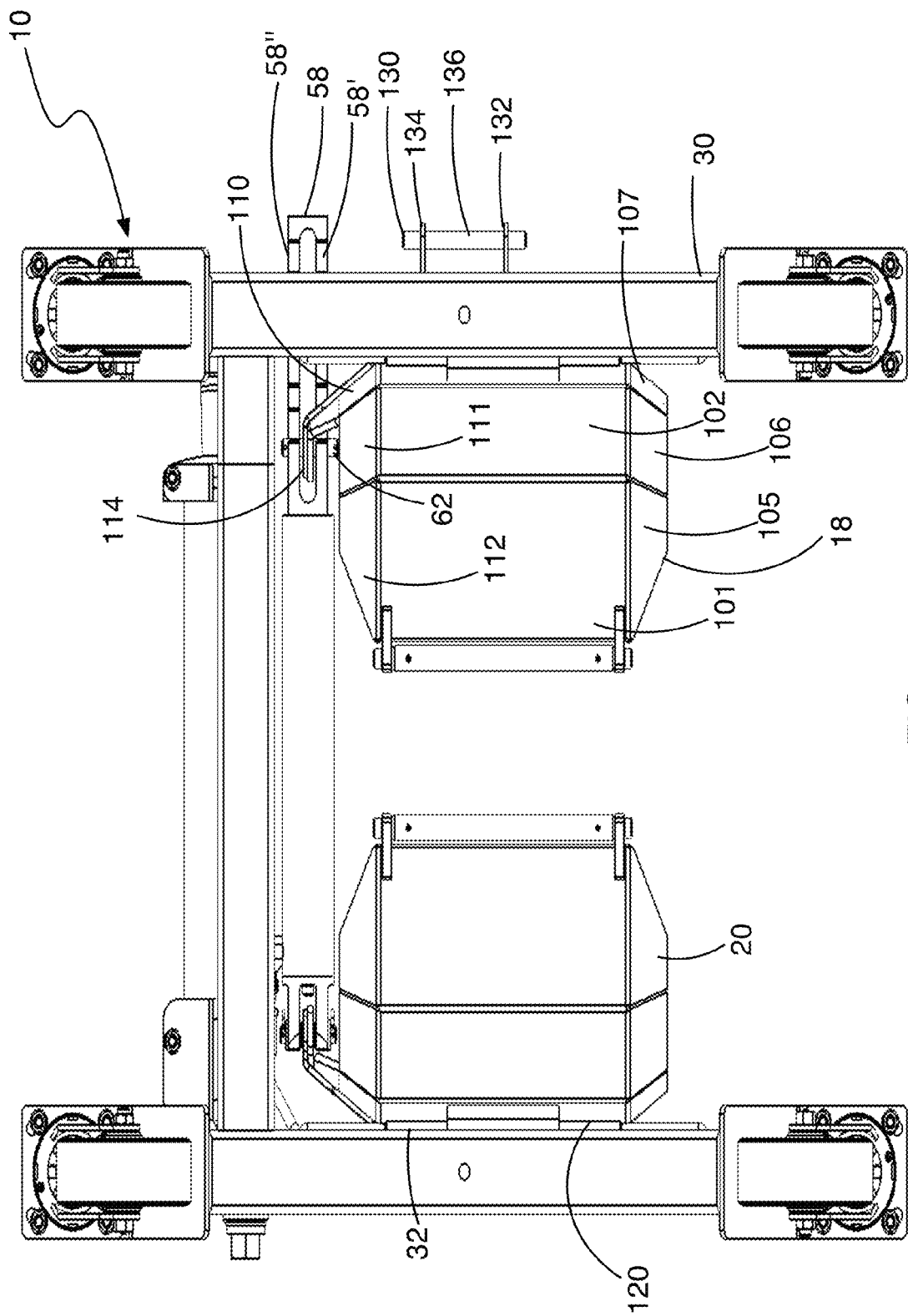
FIG. 7 is a bottom view of the wheel dolly illustrated in FIG. 1.

FIGS. 6 and 7 are top and bottom views, respectively, of the wheel dolly 10 of the present invention. Each wheel scoop 18 and 20 (see also FIGS. 2 and 3) is comprised of a single plate of metal, such as aluminum, steel or other metals known in the art, that has been shaped into a scoop-like form as illustrated. Referring specifically to scoop 18 (with scoop 20 being similarly but oppositely configured), the scoop 18 is comprised of a plurality of substantially planar sections 101-104 that are angled relative to one another to effectively form a curved surface. A corresponding plurality of outwardly angled wall sections 105-112 depending from the planar sections 101-104 to form the scoop 18. Each wall section is proximate to the adjacent wall section and may be joined by welding so as to substantially increase the structural rigidity and integrity of the scoop 18. A vertically oriented wall 114 depends from the scoop 18 to which the post 62 is attached. The post 62 extends on both sides of the wall 114. The retaining member 58 is comprised of a pair of side walls 58' and 58", each having the slots 61 disposed therein. The pair of side walls 58' and 58" engage the post 62 on opposite sides of the wall 114. This allows the post 62 to be forced away from the scoop 20 by the ram 24 without being bent relative to the wall 114 as may be the case if the retaining member 58 only engaged the post 62 on one side of the wall 114. Similarly, the pivoting end of the ram 24 is coupled to the scoop 20 as by being pinned to and extending on both sides of the side wall of the scoop 20, again ensuring that the ram 24 is secured to the scoop 20 without the possibility of the scoop being detached from or becoming bound relative to the ram 24.

As further illustrated in FIGS. 6 and 7, with particular reference to scoop 20, each scoop is provided with an elongate idle roller assembly 50. The idle roller assembly is attached to the leading edge of the scoop 20, that is the end of the scoop 20 that engages the bottom of the tire. The idle roller assembly 50 is comprised of a pair of laterally spaced support members 50' that are fixedly coupled to the scoop 20 at a bottom edge thereof. Each lateral support member 50' includes a bearing therein so as to allow free rotation of the roller member 50" that is disposed between the support members 50'. Because the roller members 50" effectively form the leading or tire engaging end of the scoop, the roller members help guide the leading or tire engaging end of the scoop under the tire. The idle roller 50 prevents any additional damage to the tire as the scoop is forced under the tire by providing rolling contact between the tire and the scoop 20, with the understanding that the weight of the aircraft on a flat tire will tend to make it difficult to slide any object under the tire. Thus, the scoops 18 and 20 can be forced under a flat tire that is still attached to an aircraft without further damaging the tire in order to successfully lift and support the aircraft tire with the wheel dolly 10 of the present invention.

As further illustrated in FIGS. 6 and 7, with specific reference to scoop 20 (with scoop 18 being similarly but oppositely configured), the back side 120 of the scoop 20 is pivotally coupled to the frame member 32. A pair of laterally spaced pivot member housings 122 and 124 is attached to the frame member 32. Pivot members 126 and 128 are attached to the back surface 120 of the scoop 20 and are disposed within a respective pivot member housing 122 and 124. The scoop 20 can thus pivot between a first position in which the scoop 20 is in a lowered position with the back 120 of the scoop 20 abutting against the inside surface of the frame member 32 to which the scoop 20 is attached to a second raised position in which the back 120 of the scoop 120 abuts against the stop 70 positioned on the top surface of the frame member 32.

The wheel dolly 10 further includes a pull handle 130 attached to the frame member 30. The pull handle 30 is comprised a pair of laterally spaced attachment members 132 and 134 to which a cylindrical handle member 135 is attached. The handle member 136 is spaced from the frame member 30 so as to allow a user to grasp the handle member 136. Likewise, a tether or tug member can be attached to the handle member 136 to pull the wheel dolly 10 to a desired location.

Figure 8:
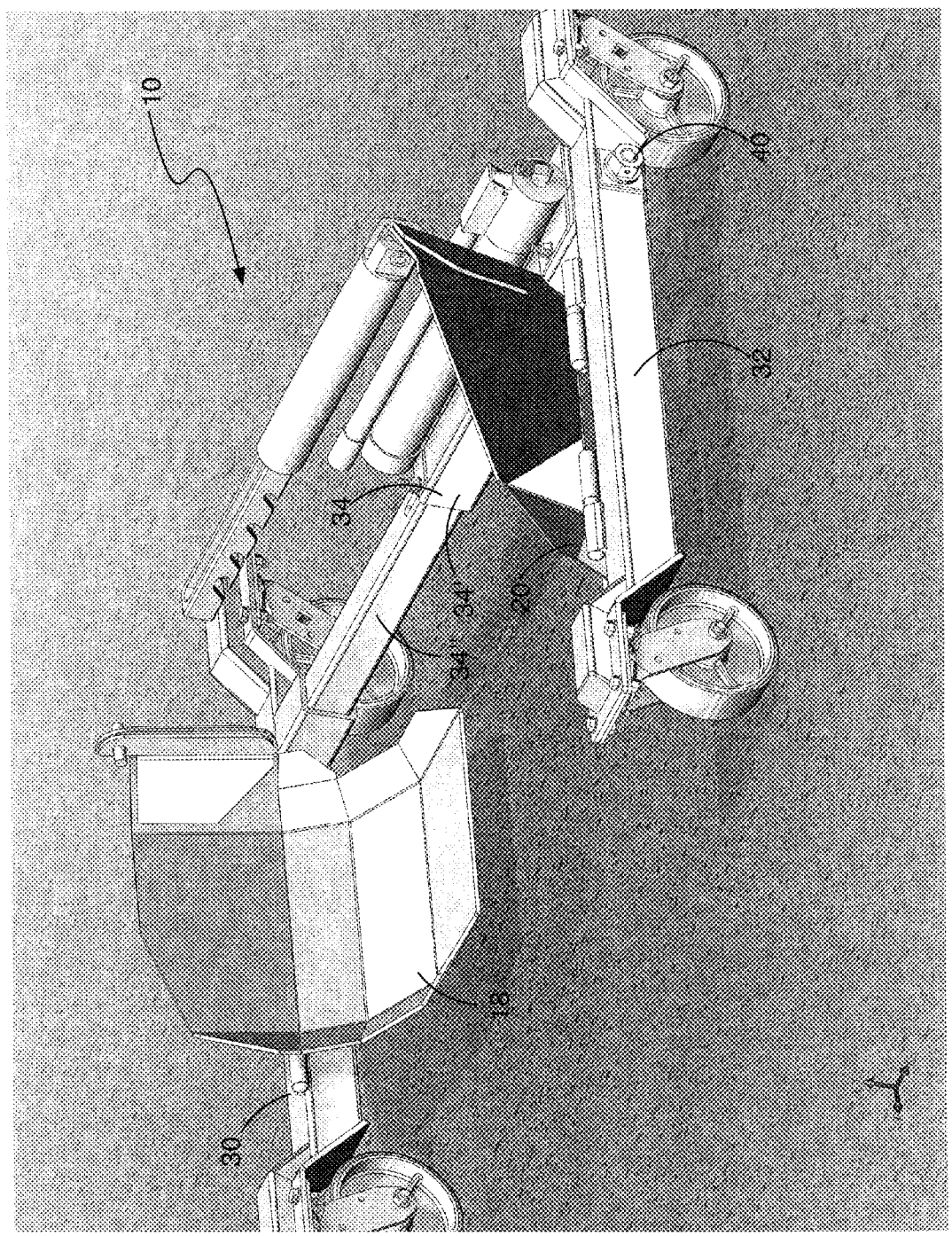
FIG. 8 is a perspective view of the wheel dolly illustrated in FIG. 1 in an expanded state.

As further illustrated in FIG. 8, in order to lift a tire, such as a flat tire on an aircraft, the scoops 18 and 20 are separated relative to one another by lengthening the telescopic frame member 34. The telescopic frame member 34 is comprised of the first rectangular frame member 34' and a second rectangular frame member 34" that is sized and shaped to fit and slide within the first rectangular frame member 34'. Rotation of the threaded actuator 40 in the proper direction causes the second frame member 34" to be extended relative to the first frame member 34'. Because the frame member 30 is attached to the second frame member 34" and the frame member 32 is attached to the first frame member 34', retraction of the second frame member 34" into the first frame member 34' moves the frame member 30 toward the frame member 32 while maintaining their substantially parallel relationship in order to move the scoops 18 and 20 away from one another. The telescopic frame member 34 is extended until the scoops 18 and 20 are separated a sufficient distance to be placed around a tire.

Figure 9:
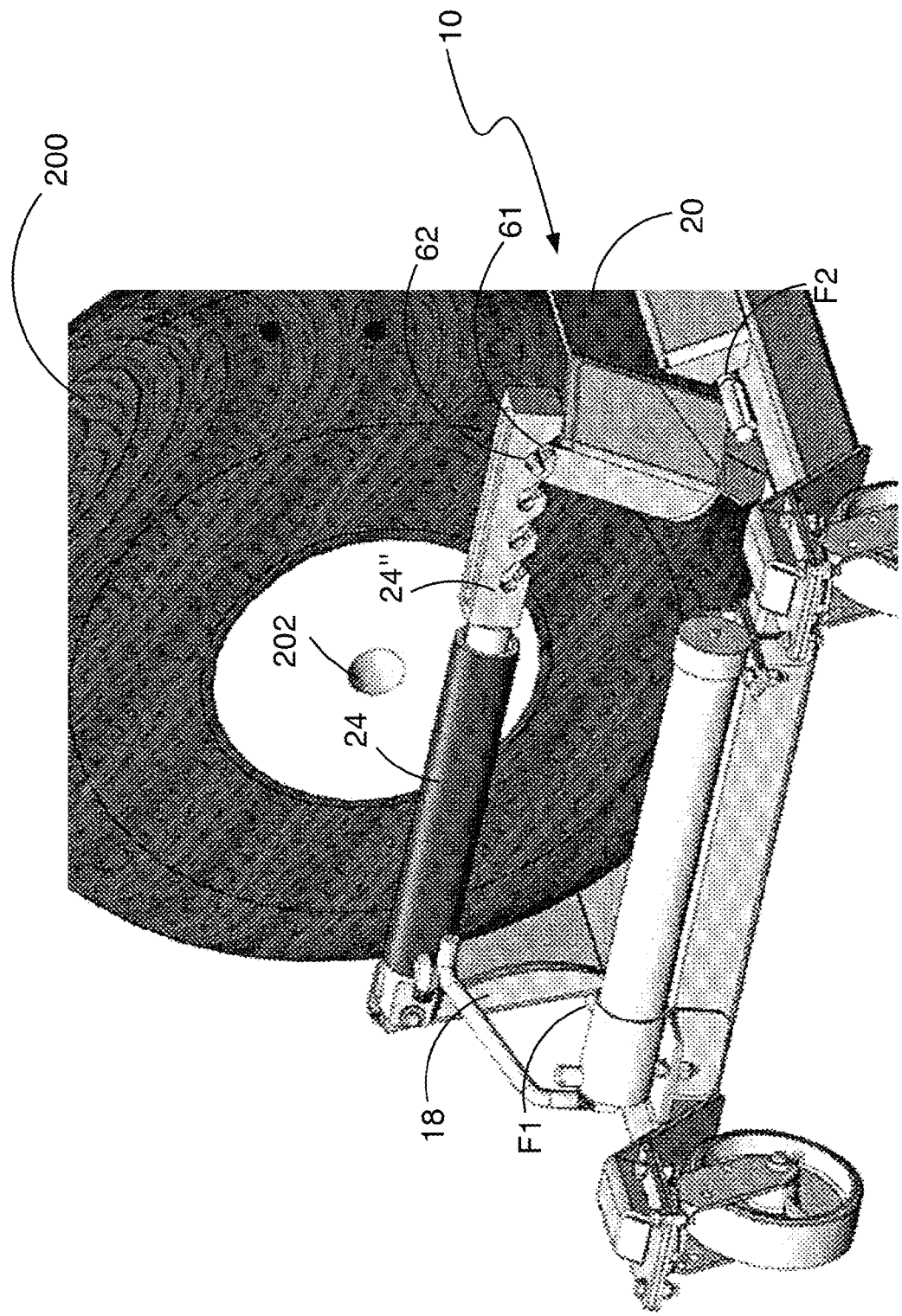
FIG. 9 is a perspective partial view of the wheel dolly with an aircraft tire supported thereby.

As shown in FIG. 9, once the tire 200, which is attached to an aircraft, has been positioned between the scoops 18 and 20, the scoops 18 and 20 are brought closer together by rotating the threaded actuator 40 in the opposite direction until the scoops fully engage the sides of the tire 200. The ram 24 has a length when contracted that will position at least one of the slots 61 relative to the post 62 so that the post 62 can engage the slot 61. Actuating the ram 24, which results in lengthening of the ram 24, forces the top ends of the scoops 18 and 20 away from one another so that they each pivot about their fulcrums F1 and F2, respectively. As the scoops 18 and 20 pivot about their respective fulcrums F1 and F2 in this manner, the bottom ends of the scoops 18 and 20 pivot upwardly to lift the tire 200 off of the ground. The tire 200 and associated aircraft can then be transported while leaving the tire 200 attached to the hub 202 of the aircraft to taxi the aircraft from the runway in the event of a flat tire 200.

While the wheel dolly of the present invention has been described with reference to a particular embodiment, those of skill in the art will appreciate that other similarly configured embodiments will readily suggest themselves upon an understanding of the principles of the present invention. Thus, the present invention of a wheel dolly and the appended claims are not limited to the features of the specific embodiments. For example, the wheel dolly could be configured to have a different overall shape, size or construction but still be within the scope of the claims.

Accordingly, the illustrated embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. Those skilled in the art who have the benefit of this invention, its teachings, and suggestions will appreciate that the concepts of this disclosure may be used as a creative basis for designing other structures, methods and systems for carrying out and practicing the present invention.

While there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or structures similar or equivalent to those described herein may be used in the practice or testing of the present invention. All references cited herein are incorporated by reference in their entirety and for all purposes. In addition, while the foregoing advantages of the present invention are manifested in the illustrated embodiments of the invention, a variety of changes can be made to the configuration, design and construction of the invention to achieve those advantages including combinations of components of the various embodiments. Hence, reference herein to specific details of the structure and function of the present invention is by way of example only and not by way of limitation.

What is claimed:

1. A wheel dolly for lifting and transporting a flat tire attached to an aircraft, comprising:
    a frame assembly comprising a telescopic frame structure, a first frame member coupled proximate a first end of the telescopic frame structure, a second frame member coupled to proximate a second end of the telescopic frame structure, the first and second frame members depending from a same side of the telescopic frame structure and being substantially parallel to one another, the telescopic frame structure interposed between the first frame member and the second frame member;
    a first tire support structure pivotally coupled to the first frame member having a leading edge that is positionable proximate a ground level when in a lowered position and that can be raised to a second position above the ground level, the first tire support structure configured and oriented to engage a first side of a tire;
    a second tire support structure pivotally coupled to the second frame member having a leading edge that is positionable proximate a ground level when in a lowered position and that can be raised to a second position above the ground level, the second tire support structure configured and oriented to engage a second side of the tire opposing the first side of the tire;
    an actuator coupled to the telescopic frame structure for selectively lengthening and shortening the telescopic frame member so as to selectively move the first and second frame members and thus the first and second tire support structures toward and away from one another;
    a ram having a first end portion pivotally coupled to an upper portion of the first tire support structure and on an opposing side of a fulcrum of the first tire support structure from the leading edge of the first tire support structure and a second end portion configured to be selectively coupled to an upper portion of the second tire support structure on an opposing side of a fulcrum of the second tire support structure from the leading edge of the first tire support structure, the ram capable of being lengthened to force the upper portion of the first tire support structure away from the upper portion of the second tire support structure to cause the leading edge of the first tire support structure to pivot toward the leading edge of the second tire support structure until the leading edge of the first tire support structure and the leading edge of the second tire support structure are sufficiently raised above the ground level to raise the tire being supported by the first tire support structure and the second tire support structure; and
    a plurality of wheels, each wheel downwardly depending from the frame assembly to allow the frame assembly to roll upon the ground when the first and second tire support structures and the supported tire are sufficiently raised above the ground level.

2. The wheel dolly of claim 1, wherein the first and second tire support structures comprise inwardly facing scoops, each scoop having a generally crescent shape.

3. The wheel dolly of claim 1, further comprising a pump in fluid communication with the ram for pressurizing the ram causing the ram to extend in length in order to pivot the first and second tire support structures relative to the first and second side frame members, respectively, so that the upper portions of the first and second tire support structures are outwardly pivoted away from each other.

4. The wheel dolly of claim 1, wherein the pump is attached to the frame assembly.

5. The wheel dolly of claim 1, wherein the telescopic frame structure comprises a first telescopic frame member and a second telescopic frame member at least partially inserted with in the first telescopic frame member, the second telescopic frame member being longitudinally movable relative to the first telescopic frame member in order to increase or decrease the length of the telescopic frame structure and thus a distance between the first and second frame members, and wherein the actuator comprises a threaded actuator assembly coupled to and between the first telescopic frame member and the second telescopic frame member such that rotation of the threaded actuator causes the telescopic frame structure to lengthen or shorten depending on the direction of rotation of the threaded actuator.

6. The wheel dolly of claim 1, wherein the ram comprises a cylinder portion pivotally coupled to the upper portion of the first tire support structure and a retaining member depending from a free end of the cylinder portion, the retaining member configured for selective coupling to the upper portion of the second tire support structure.

7. The wheel dolly of claim 6, wherein the retaining member comprises a plurality of angled slots and the second tire support structure further comprises a transversely extending post coupled to the upper portion of the second tire support structure, the plurality of angled slots configured for engaging with the post to accommodate spacing between the upper portions of the first and second tire support structures.

8. The wheel dolly of claim 1, wherein each of the first and second tire support structures comprise an idle roller coupled to the leading edge thereof for engaging with a flat tire and guiding the respective tire support structure between the flat tire and the ground, as the leading edges of the first and second tire support structures are lifted.

9. The wheel dolly of claim 8, wherein the idle roller extends substantially a length of the leading edge.

10. The wheel dolly of claim 1, wherein the first and second tire support structures each define a back surface extending from the leading edge to a top edge and wherein the first and second tire support structures are each pivotally coupled to a respective side frame member proximate a midportion of the back surface.

11. A wheel dolly for lifting and transporting a flat tire attached to an aircraft, comprising:
    a frame assembly comprising first and second laterally spaced frame members and a telescopic frame structure interposed between the first and second laterally spaced frame members, the telescopic frame structure capable of selectively increasing or decreasing a distance between the first and second laterally spaced frame members;

a first tire scoop and a second tire scoop, the first and second tire scoops oriented to face each other for engaging a tire interposed therein between, the first tire scoop pivotally coupled to the first frame member and the second tire scoop pivotally coupled to the second frame member;

a first actuator coupled between the first and second tire scoops configured for selectively pivoting the first and second tire scoops relative to the frame assembly in order to raise or lower lower portions of the first and second tire scoops relative to the frame assembly; and a plurality of castors coupled to the frame assembly, the plurality of castors being freely rotatable relative to the frame assembly to allow the frame assembly to roll in any direction wherein the first actuator comprises a ram having a first end portion pivotally coupled to an upper portion of the first tire scoop and a second end portion configured to be selectively coupled to an upper portion of the second tire scoop, the ram capable of being lengthened to force the upper portion of the first tire scoop away from the upper portion of the second tire scoop to cause the first tire scoop to pivot relative to the first side frame member and the second tire scoop to pivot relative to the second side frame member until the lower portions of the first and second tire scoops are sufficiently raised above a ground level.

12. The wheel dolly of claim 11, further comprising a second actuator coupled to the telescopic frame structure for controlling a length of the telescopic frame structure in order to selectively separate or bring together the first and second tire scoops.

13. The wheel dolly of claim 11, further comprising a pump in fluid communication with the ram for causing the ram to extend in length in order to pivot the first and second tire support structures relative to the first and second laterally spaced frame members, respectively.

14. The wheel dolly of claim 13, wherein the pump is attached to the frame assembly.

15. The wheel dolly of claim 12, wherein the telescopic frame structure comprises a first telescopic frame member and a second telescopic frame member at least partially inserted with in the first telescopic frame member, the second telescopic frame member being longitudinally movable relative to the first telescopic frame member in order to increase or decrease the length of the telescopic frame structure and thus a distance between the first and second frame members, and wherein the second actuator comprises a threaded actuator assembly coupled to and between the first telescopic frame member and the second telescopic frame member such that rotation of the threaded actuator causes the telescopic frame structure to lengthen or shorten depending on the direction of rotation of the threaded actuator.

16. The wheel dolly of claim 11, wherein the ram comprises a cylinder portion pivotally coupled to the upper portion of the first tire scoop and a retaining member depending from and movable relative to a free end of the cylinder portion, the retaining member configured for selective coupling to the upper portion of the second tire scoop.

17. The wheel dolly of claim 16, wherein the retaining member comprises a plurality of angled slots and the second tire scoop further comprises a transversely extending post coupled to the upper portion of the second tire scoop, the plurality of angled slots configured for engaging with the post to accommodate spacing between the upper portions of the first and second tire support structures.

18. The wheel dolly of claim 11, wherein each of the first and second tire scoops comprise an idle roller coupled to a leading edge thereof for engaging with a tire and guiding the respective tire scoop between a flat tire and the ground.

19. The wheel dolly of claim 18, wherein the idle roller extends substantially a length of the leading edge.

20. The wheel dolly of claim 11, wherein the first and second tire scoops each define a back surface extending from the leading edge to a top edge and wherein the first and second tire support structures are each pivotally coupled to a respective side frame member proximate a midportion of the back surface.

* * * * *